United States Patent
Pursifull et al.

(10) Patent No.: US 8,944,528 B2
(45) Date of Patent: Feb. 3, 2015

(54) METHOD AND SYSTEM FOR BRAKE CONTROL

(71) Applicant: Ford Global Technologies, LLC, Dearborn, MI (US)

(72) Inventors: Ross Dykstra Pursifull, Dearborn, MI (US); Moses Alexander Fridman, West Bloomfield, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/109,392

(22) Filed: Dec. 17, 2013

(65) Prior Publication Data

US 2014/0102086 A1    Apr. 17, 2014

Related U.S. Application Data

(63) Continuation of application No. 13/290,873, filed on Nov. 7, 2011, now Pat. No. 8,641,152.

(51) Int. Cl.
| | |
|---|---|
| *B60T 8/42* | (2006.01) |
| *B60T 13/66* | (2006.01) |
| *B60T 7/04* | (2006.01) |
| *B60T 8/44* | (2006.01) |

(52) U.S. Cl.
CPC ............... *B60T 13/662* (2013.01); *B60T 7/042* (2013.01); *B60T 8/442* (2013.01); *B60T 8/441* (2013.01)
USPC ....................... 303/114.1; 701/113; 123/179.3

(58) Field of Classification Search
USPC .......... 303/15, 20, 113.1, 113.5, 114.1, 114.3; 60/547.1; 701/29, 48, 113; 123/179.3, 123/179.4
See application file for complete search history.

(56) References Cited

U.S. PATENT DOCUMENTS

| | | | |
|---|---|---|---|
| 6,754,579 B2 | 6/2004 | Kamiya et al. | |
| 7,216,479 B2 | 5/2007 | Tamura | |
| 7,878,053 B2 | 2/2011 | Lehner et al. | |
| 8,038,228 B2 * | 10/2011 | Gronau et al. | ............. 303/114.3 |
| 8,165,747 B2 * | 4/2012 | Ueno et al. | ........................ 701/36 |
| 8,287,055 B2 | 10/2012 | Lee | |
| 8,641,152 B2 * | 2/2014 | Pursifull et al. | ........... 303/114.1 |
| 2001/0020800 A1 | 9/2001 | Isono et al. | |
| 2009/0071147 A1 | 3/2009 | Wang et al. | |
| 2010/0036566 A1 | 2/2010 | Hayami | |
| 2010/0244549 A1 | 9/2010 | Koshimizu et al. | |
| 2011/0174244 A1 | 7/2011 | Maki et al. | |
| 2011/0178687 A1 * | 7/2011 | Anderson et al. | ................ 701/70 |
| 2011/0254358 A1 | 10/2011 | Strengert et al. | |
| 2012/0237366 A1 | 9/2012 | Pursifull | |
| 2012/0285421 A1 | 11/2012 | Cunningham et al. | |

FOREIGN PATENT DOCUMENTS

EP        0990793 A3    5/2000

\* cited by examiner

*Primary Examiner* — Christopher Schwartz
(74) *Attorney, Agent, or Firm* — Julia Voutyras; Alleman Hall McCoy Russell & Tuttle LLP

(57) ABSTRACT

Methods and systems are provided to reduce a hard brake pedal feel. A brake control variable is adjusted in anticipation of a hard pedal condition to increase hydraulic brake line pressure and maintain a normal pedal feel. A pedal force is inferred from brake line pressure relative to brake booster vacuum.

20 Claims, 4 Drawing Sheets

METHOD AND SYSTEM FOR BRAKE CONTROL

CROSS REFERENCE TO RELATED APPLICATIONS

The present application is a continuation of U.S. patent application Ser. No. 13/290,873, entitled "METHOD AND SYSTEM FOR BRAKE CONTROL," filed on Nov. 7, 2011, the entire contents of which are hereby incorporated by reference for all purposes.

FIELD

The present application relates to methods and system for reducing a hard pedal condition that may occur during brake pedal operation.

BACKGROUND/SUMMARY

Braking devices for enabling vehicle speed control may be operated using vacuum. The vacuum may be provided by the engine via the engine intake manifold. Alternatively, a vacuum pump may be operated to provide the vacuum. As such, if there is insufficient vacuum to assist in the brake operation, a "hard pedal" condition may occur wherein the vehicle operator has to provide a larger brake pedal force than expected to attain the desired braking. Various approaches have been developed to mitigate such a "hard pedal" condition.

One such approach is shown by Kamiya et al. in U.S. Pat. No. 6,754,579. Therein, an engine controller automatically starts an engine upon determining that there is insufficient brake booster vacuum. In particular, Kamiya adjusts an automatic engine restart operation based on a brake pedal depression amount and a brake booster vacuum amount.

However, the inventors herein have recognized a potential issue with such an approach. As one example, the operator's hard pedal feeling may be prolonged while the engine is restarted and the appropriate amount of vacuum is generated. As another example, there may be conditions when even upon restarting the engine, the desired amount of vacuum cannot be generated due to other demands on the engine.

In one example, at least some of the above-mentioned issues may be at least partly addressed by a method of improving a brake pedal feel, comprising: adjusting a brake control variable in response to an impending change in a pedal feel, the impending change based on a hydraulic brake line pressure relative to a brake booster pressure. In this way, hydraulic brake line pressure may be increased before a hard pedal condition arises.

In one example, an engine controller may infer or identify the impending change in pedal feel based on a hydraulic brake pressure relative to the brake booster pressure (or vacuum level). In particular, in response to an impending change (e.g., increase) in the amount of pedal force required to displace the brake pedal, the controller may infer that a hard pedal condition may arise imminently. Accordingly, before the hard pedal condition occurs, the controller may increase the hydraulic brake line pressure by increasing an amount of hydraulic brake boost that is provided to the brake line. Specifically, an electrically-actuated hydraulic brake booster pump (e.g., an electric pump coupled to a hydraulic brake booster component or an ABS brake system component) may be operated and the pump output may be increased. Alternatively, or additionally, the vacuum level in the brake booster may be increased, for example, using vacuum from the engine intake manifold.

In this way, by increasing the hydraulic brake line pressure via adjustments to one or more brake system components before an impending hard pedal condition occurs, a hard pedal feel incurred by a vehicle operator during brake application can be averted. As such, this may improve the operator's driving experience.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
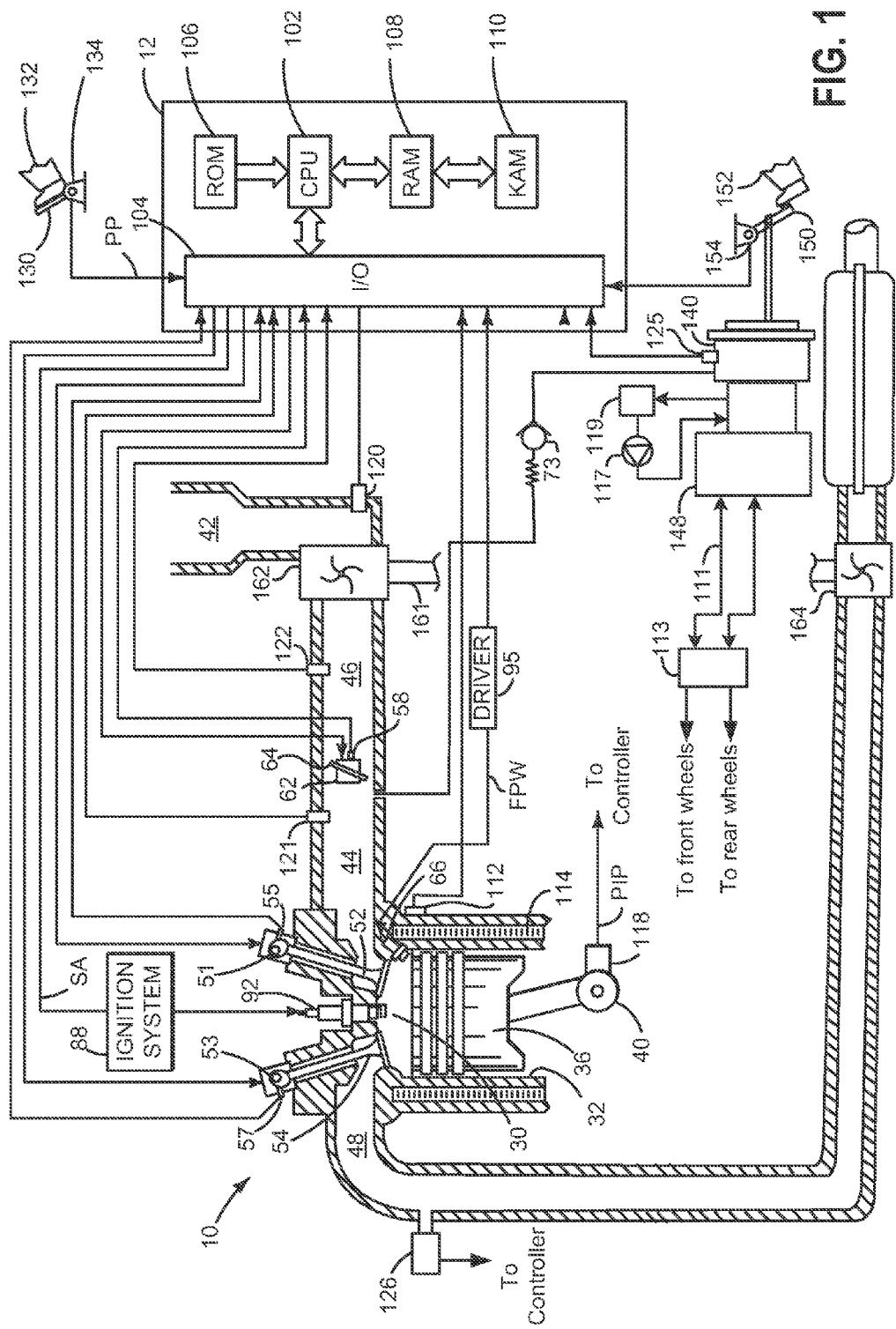
FIG. 1 shows a schematic depiction of an engine and an associated brake system.

The present description relates to methods and systems for improving a brake pedal feel so as to reduce the likelihood of a "hard pedal" condition in an engine system, such as the engine system of FIG. 1. An engine controller may be configured to perform a control routine, such as the example routine of FIG. 2, to adjust the operation of one or more brake system components so as to increase a hydraulic brake line pressure in anticipation of an impending hard pedal condition. The controller may be configured to infer an impending change in the pedal feel (that is, the pedal force required to achieve a desired change in brake pedal position) based on the hydraulic brake line pressure relative to the brake boost vacuum level, for example, using the characteristic curves of FIG. 3. As shown in the example of FIG. 4, by making the appropriate adjustments before a hard pedal condition occurs, the brake line pressure may be increased so that a ratio of pedal force applied to brake pedal displacement can be maintained below a threshold amount. That is, a "softer" brake pedal feel can be maintained.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 95 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. A waste gate (not shown) coupled to the turbine may allow exhaust gases to bypass turbine 164 so that boost pressure can be controlled under varying operating conditions.

The engine may be coupled to a brake system, such as an anti-lock brake system, including various brake components configured to adjust the pressure in a hydraulic brake line. These may include, for example, an electric pump, a vacuum-actuated brake booster, and a hydraulic brake booster, as referenced herein. Brake booster 140, including an internal vacuum reservoir, may be configured to provide a vacuum assist during brake application. Specifically, brake booster 140 may amplify force provided by foot 152 via brake pedal 150 to master cylinder 148 for applying vehicle brakes (not shown). In one example, as depicted, the brake booster may be coupled to the intake manifold 44 of the engine 10, downstream of compressor 162, only through a check valve 73. Herein, check valve 73 allows air to flow to intake manifold 44 from brake booster 140 and limits air flow to brake booster 140 from intake manifold 44. Check valve 73 accommodates fast pull down of the vacuum reservoir pressure when the reservoir pressure is relatively high and intake manifold pressure is low. Consequently, the vacuum reservoir of brake booster 140 is rapidly supplied with vacuum from intake manifold 44 via check valve 73. In alternate embodiments, brake booster 140 may also be supplied with vacuum from a vacuum pump (not shown) via a check valve (not shown) that allows air to flow to the vacuum pump from brake booster 140 and limits air flow to brake booster 140 from the vacuum pump.

A hydraulic brake booster 116, coupled to an electrically-actuated hydraulic brake boost pump 117 and a hydraulic brake fluid reservoir 119, may be configured to provide a hydraulic assist during brake application. Hydraulic brake boost pump 117 may be electrically-actuated and operated using a battery, for example. The hydraulic brake booster 116 may be coupled between the vacuum-actuated brake booster 140 and the hydraulic brake line 111, more specifically between the brake booster 140 and master cylinder 148. A braking device, such as vehicle brakes coupled to vehicle wheels (not shown), may be hydraulically coupled downstream of master cylinder 148 via hydraulic brake line 111. The braking device may be any suitable device such as drum brakes, or disc brakes. Additionally, an anti-lock brake system (ABS) 113 may be coupled to the braking device, for example downstream of the master cylinder 148. In one embodiment, ABS 113 may be hydraulically coupled to master cylinder 148 and four wheel cylinders of the left front wheel, right front wheel, left rear wheel and right rear wheel.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; brake booster reservoir pressure from pressure sensor 125; an engine position sensor from a Hall effect sensor 118 sensing crankshaft 40 position; a measurement of air mass entering the engine from sensor 120 (e.g., a hot wire air flow meter); a hydraulic brake line pressure from a pressure sensor (not shown) coupled to hydraulic brake line 111; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
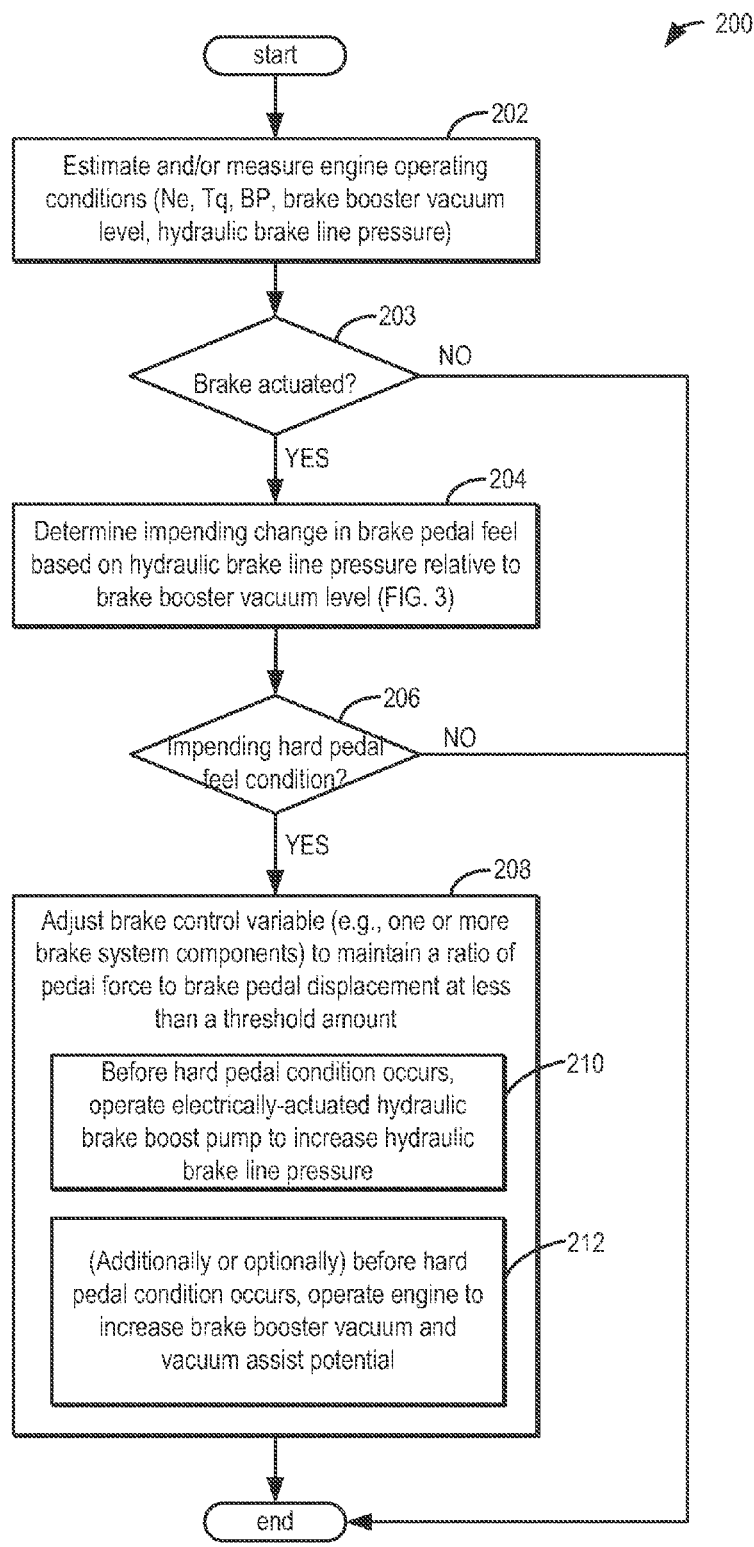
FIG. 2 shows a high level flowchart of an example method for improving a brake pedal feel.

Now turning to FIG. 2, an example method 200 for improving brake pedal feel is elaborated. The method includes adjusting a brake control variable in response to an impending change in a pedal feel, wherein the impending change is based on a hydraulic brake line pressure relative to a brake booster pressure. By making adjustments to the hydraulic brake line pressure, a hard pedal condition can be averted.

At 202, the method includes measuring and/or estimating engine operating conditions. These may include, for example, engine speed, engine coolant temperature, catalyst temperature, brake booster vacuum (that is, the vacuum level in the brake booster vacuum reservoir), hydraulic brake line pressure, desired engine torque, vehicle speed, barometric pressure, etc. At 203, it may be confirmed that vehicle brakes have been actuated. That is, it may be confirmed that the vehicle operator has applied their foot on the brake pedal and depressed the brake pedal. As such, in response to the brake pedal application, based on prevalent operating conditions, the engine may continue to be fueled, or fueling may be discontinued. In one example, when a vehicle battery state of charge is lower than a threshold state of charge, the engine may continue to be fueled. In another example, when the vehicle battery state of charge is higher than the threshold state of charge, a deceleration fuel shut-off operation may be performed.

Upon confirmation of brake pedal application, at 204, the method includes determining an impending change in brake pedal feel based on hydraulic brake line pressure relative to brake booster vacuum level. As such, the brake pedal feel includes a pedal force required to displace the brake pedal to a given pedal position. Further, a normal or "soft" pedal feel may be desired wherein the pedal force required to displace the brake pedal to the given position is maintained lower than a threshold amount. However, during certain conditions, a "hard" pedal feel may be incurred wherein the pedal force required to displace the brake pedal to the given position is higher than the threshold amount. As the pedal feel gets harder, a larger pedal force is needed to move the brake pedal to the given pedal position. The controller may use a look-up table that references one or more characteristic curves, such as those shown in FIG. 3, to determine whether an impending hard pedal condition is present. That is, the controller may anticipate the hard pedal condition before the condition actually arises, and perform mitigating actions to pre-empt the condition. As a result, the vehicle operator may not feel a hard brake pedal during brake application.

Figure 3:
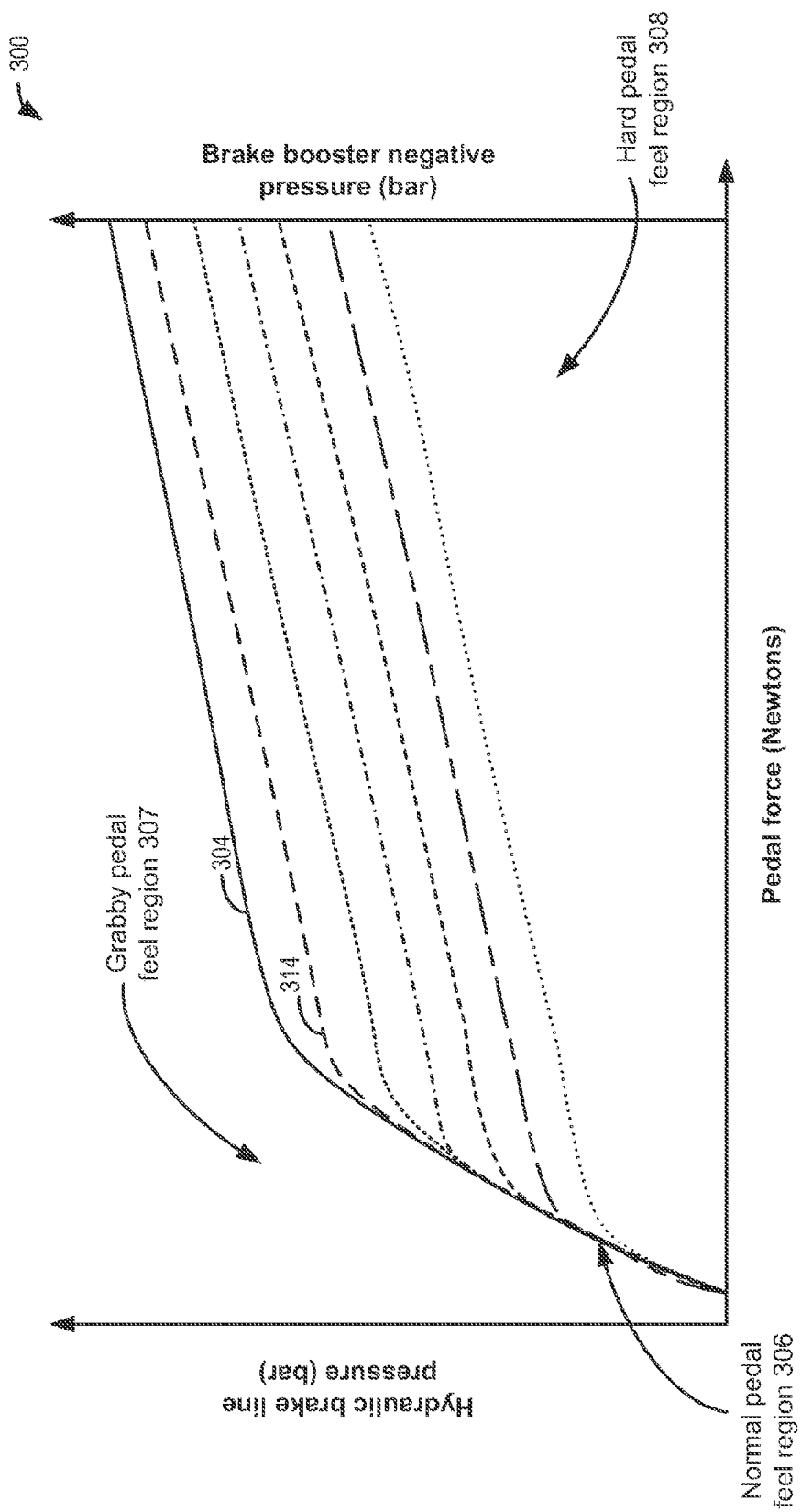
FIG. 3 shows characteristic curves of hydraulic brake line pressure relative to brake booster vacuum that may be used to infer an impending hard pedal condition.
Figure 4:
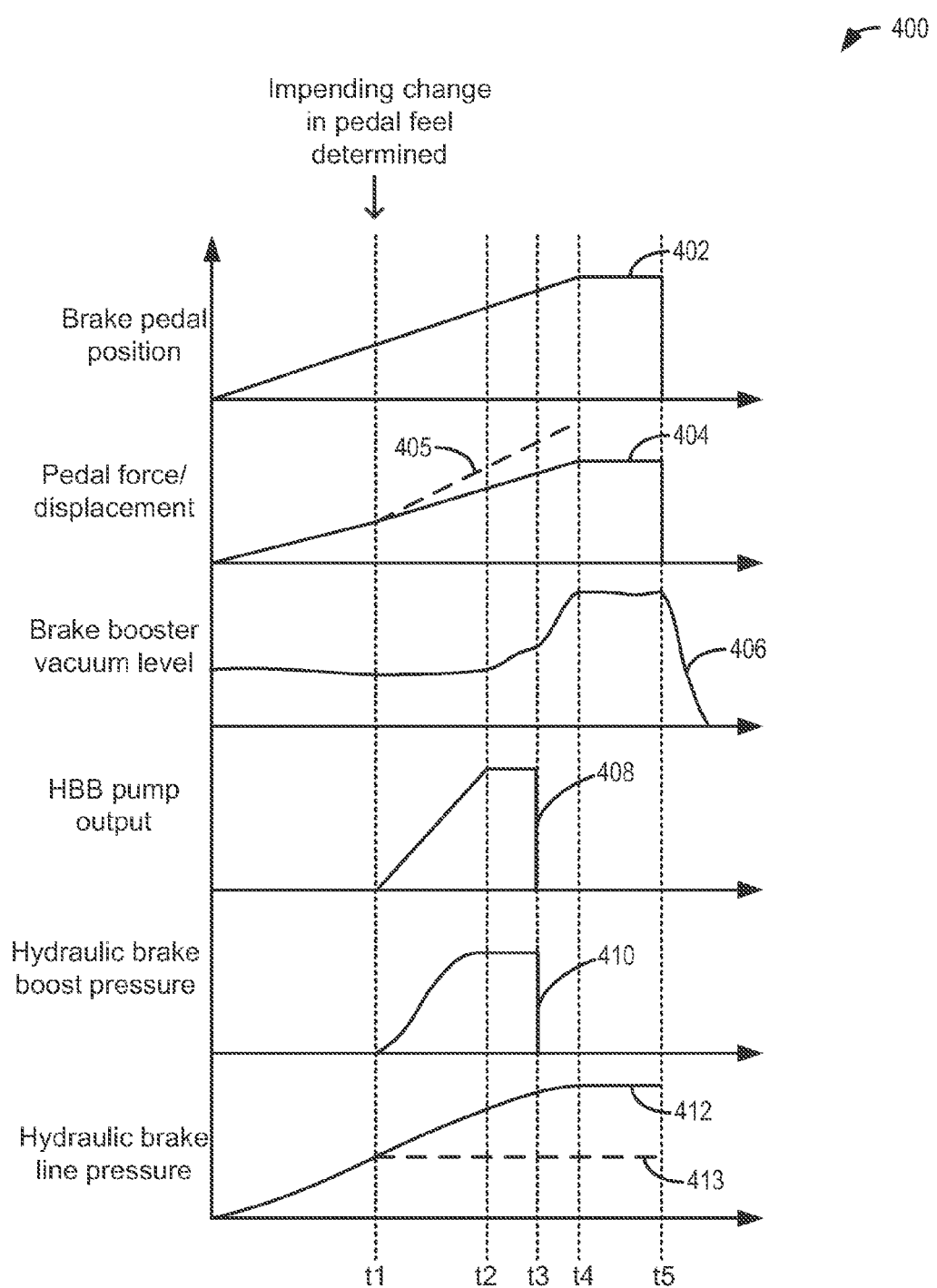
FIG. 4 shows an example adjustment to one or more brake system components in response to an impending change in pedal feel.

With reference to FIG. 3, it shows at map 300, characteristic curves for changing pedal force along the x-axis, based on a hydraulic brake line pressure (as shown along the left-most y-axis) relative to a constant brake booster vacuum (as shown along the right-most y-axis). Herein, a pedal force may be inferred based on the hydraulic brake line pressure relative to brake booster vacuum, and without needing to estimate a brake pedal position. As such, this allows the pedal force to be inferred accurately without requiring a brake pedal position sensor, which would otherwise add to component costs.

When brake operation continues along any of the depicted characteristic curves (that is, in normal pedal feel region 306), a normal brake pedal feel is enabled. When operating conditions cause brake operation to move to the right of, and/or below, the characteristic curves (that is, in hard pedal region 308), a hard brake pedal feel is incurred. As such, when operating conditions cause brake operation to move to the left of, and/or above, the characteristic curves (that is, in grabby pedal feel region 307), a degraded brake feel may also be incurred wherein the brakes feel extra-grabby.

As shown in map 300, for a given combination of brake booster pressure relative to brake booster vacuum, the pedal feel changes from a softer condition to a harder condition at a given pedal force. For example, a first characteristic curve is shown at 304 (solid line). Herein, the brake booster vacuum may be 0.925 bar (or 27 inHg) while the hydraulic brake line pressure is 0.9 bar. Under these conditions, a normal pedal feel may be experienced at inferred pedal forces along the steeper section of curve 304 (as also shown by normal, or soft, pedal feel region 306) while a hard pedal feel may be experienced when the inferred pedal force is to the right of, or below the knee region of curve 304 as well as along the shallower section of curve 304 (as shown by hard pedal feel region 308). As such, the knee of the curve may correspond to the intersection of the tangent of the two sections of the curve (including the first steeper section and the second shallower section). As the brake booster vacuum level drops (that is, there is less vacuum available in the brake booster reservoir), the change in pedal feel may occur at relatively lower pedal forces. That is, the hard pedal feel may occur earlier during brake pedal application. Thus, for a second characteristic curve shown at 314 (dashed line), wherein brake booster vacuum is 0.875 bar (or 24 inHg) while the hydraulic brake line pressure is 0.8 bar, the change in brake pedal feel (or knee region of curve 314) may occur at a lower inferred pedal force than for curve 304. In this way, by comparing the estimated hydraulic brake line pressure (as estimated by a brake line pressure sensor) with the estimated brake booster vacuum level (as estimated by a vacuum reservoir pressure sensor), a controller may determine an inferred pedal force, and accordingly determine whether the brake pedal is in the normal pedal feel region, or approaching the hard pedal feel region.

Returning to FIG. 2, at 206, the method includes determining whether there is an impending change in pedal feel, in particular, whether an impending hard pedal condition is present. As used herein, the impending change includes, when a change in hydraulic brake line pressure relative to a change in brake booster pressure is higher than a threshold amount, inferring an impending hard pedal feel, and when the change in hydraulic brake line pressure relative to the change in brake booster pressure is lower than the threshold amount, inferring an impending hard pedal feel is not present, and that the brake pedal is in the normal (or soft) pedal feel region.

If an impending hard pedal condition is not confirmed, the routine may end. Upon confirmation of the hard pedal condition, at 208, one or more brake control variables may be adjusted before the hard pedal condition arises to maintain a ratio of brake pedal force to brake pedal displacement below a threshold amount. That is, the hard pedal feel may be pre-empted by maintaining the soft pedal feel using adjustments to one or more brake system components.

In one example, as shown at 210, the brake control variable includes a hydraulic brake boost from a hydraulic brake booster of the vehicle's brake system. Herein, the adjustment may include, as the impending change in pedal feel moves towards a harder pedal feel, increasing the hydraulic brake boost supplied to a hydraulic brake line to increase the hydraulic brake line pressure. Specifically, increasing the hydraulic brake boost may include operating an electrically-actuated hydraulic brake boost pump to increase a hydraulic pressure (or flow) output from the pump. The pump may be coupled to other brake system components, such as anti-lock brakes.

In another example, as shown at 212, the brake control variable may include a brake booster vacuum. Herein, the adjustment may include, as the impending change in pedal feel moves towards a harder pedal feel, increasing the brake booster vacuum by operating the engine for a duration. For example, if the engine was in a DFSO condition when the impending change in pedal feel is confirmed, the engine may be refueled and spun for a duration to generate intake manifold vacuum that is then used to refill the vacuum reservoir of the vacuum-actuated brake booster.

In still further examples, as elaborated below with reference to the example of FIG. 4, a combination of hydraulic brake boost and vacuum generation may be used to increase the hydraulic brake line pressure and reduce the likelihood of a hard pedal condition. In this way, by inferring an impending hard pedal condition before the hard pedal condition actually occurs, and by also performing adjustments to brake system components before the hard pedal condition occurs, hard pedal conditions may be reduced and driver pedal feel may be improved.

Now turning to FIG. 4, map 400 shows an example scenario wherein adjustments to one or more brake system components (or brake control variables) are used to improve a brake pedal feel. Map 400 depicts example changes in a brake pedal position at graph 402, changes in a ratio of pedal force to brake pedal displacement (herein also referred to as the pedal feel) are depicted at graph 404, changes to a brake booster vacuum level are depicted at graph 406, changes in a hydraulic brake booster pump output are depicted at graph 408, changes in a hydraulic brake boost pressure are depicted at graph 410, and changes in a hydraulic brake line pressure are depicted at graph 412, over a duration of vehicle operation (along the x-axis).

At t0, the vehicle operator may initiate a brake pedal application (as indicated by a change in brake pedal position or displacement). As such, the operator may continue pressing down on the brake pedal between t0 and t4, and may then maintain the pedal position between t4 and t4. The operator may then release the brake pedal at t5 (graph 402). As such, at the time that the operator initiates brake pedal application, the brake booster vacuum may be higher than a threshold amount such that the brake booster is able to provide sufficient vacuum brake assist and such that the change in pedal force to pedal displacement (graph 404), that is the pedal feel, remains "soft" or normal (that is, lower than a threshold amount). At t1, based on the combination of hydraulic brake line pressure relative to the brake booster vacuum level, in the absence of any further adjustments, the pedal force required to displace the brake pedal may start to increase (see dashed line 405) such that an eventual hard pedal condition may occur. For example, in the absence of an adjustment, the pedal force to pedal displacement ratio may start to increase until an actual hard pedal condition is incurred at t4. As the brake pedal is depressed, and a vacuum assist is provided, the hydraulic brake pressure may start to increase (graph 412). However, in the absence of any further adjustments, after t1 it may also not be possible to continue raising the hydraulic brake line pressure responsive to the continued change in brake pedal position. That is, hydraulic brake line pressure may saturate (as shown at dashed line 413).

Accordingly, at t1, a controller may infer an impending hard pedal condition, before the hard pedal condition actually occurs, based on the brake booster vacuum relative to the hydraulic brake line pressure. Specifically, the hard pedal condition is not inferred based on an estimated change in brake pedal position. In response to the inference, between t1 and t4, the controller may be configured to increase the hydraulic brake line pressure via adjustments to one or more brake system components to maintain a ratio of pedal force to brake pedal displacement at less than a threshold amount (that is, to maintain the pedal feel on solid line 404). As such, the adjustments to the one or more brake system components may be performed before the hard pedal condition occurs.

In the depicted example, the one or more brake system components include an electrically-actuated hydraulic brake booster pump and a vacuum-actuated brake booster. In the depicted example, the controller may first perform adjustments to the hydraulic brake booster pump and then, if needed, may further perform adjustments to the brake booster vacuum. Specifically, between t1 and t2, the controller may operate the electrically-actuated pump to increase pump output (graph 408) and correspondingly increase a hydraulic brake boost pressure (graph 410) provided to the hydraulic brake line. As such, this allows the hydraulic brake line pressure to continue increasing responsive to the continued brake pedal displacement (graph 412).

In one example, based on the state of charge of the battery that powers that electric pump, the pump may be operated at the maximum output for a duration corresponding to t2 through t3, after which operation of the pump may need to be discontinued. As such, if pump operation is discontinued while the brake pedal continues to be applied, the change in pedal feel to a harder feel may return. Accordingly, in anticipation of no further pump output being available after t3, the controller may initiate adjustments to the brake booster vacuum. In one example, a DFSO operation may have been initiated in response to the brake pedal application at t1. Accordingly, at t2, the controller may return fuel to the engine and operate the engine for a duration (between t2 and t4) to increase intake manifold vacuum, and accordingly increase the brake booster vacuum. In particular, between t2 and t3, while the pump output and the corresponding hydraulic brake boost is available, brake booster vacuum may be increased at a first, smaller rate. Then, between t3 and t4, when the pump operation is discontinued and the hydraulic brake boost is not available, but the brake pedal continues to be applied, brake booster vacuum may be increased at a second, higher rate to compensate for the (now unavailable) hydraulic brake boost assist while also providing the required vacuum assist for the brake pedal application. In this way, the example depicts includes increasing hydraulic brake line pressure up to a first threshold pressure (that is, the brake line pressure attained at t2) by increasing hydraulic brake boost pressure, and then further increasing hydraulic brake line pressure beyond the first threshold pressure by increasing brake booster vacuum.

Between t4 and t5, while pedal position is maintained, brake booster vacuum and hydraulic brake line pressure may be maintained. Then at t5, in response to the brake pedal being released, the brake line pressure and the brake booster vacuum may be reduced.

In this way, by increasing a hydraulic brake line pressure via adjustments to one or more brake system components, the pedal force to pedal displacement ratio for a brake pedal may be maintained within a threshold amount. By performing the adjustments in response to an impending change in a pedal feel, a hard pedal condition can be averted. By inferring the impending a hard pedal condition based on hydraulic brake line pressure and brake booster vacuum, the need for expensive brake pedal position sensors for detecting a hard pedal condition can be reduced. By identifying an impending hard pedal condition, and mitigating the impending hard pedal condition before the condition actually occurs, a vehicle operator's drive experience can be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for improving brake pedal feel, comprising:
    inferring, via an electronic controller, an impending hard pedal condition, before the hard pedal condition occurs, based on a brake booster vacuum relative to a hydraulic brake line pressure; and
    in response to the inference, increasing the hydraulic brake line pressure via adjustments to a brake system component to maintain a ratio of pedal force to brake pedal displacement at less than a threshold.

2. The method of claim 1, wherein a vacuum level in the brake booster is increased using vacuum from an engine intake manifold.

3. The method of claim 2, wherein the engine is turbocharged.

4. The method of claim 3, wherein the adjustments to one or more brake system components are performed before the hard pedal condition occurs.

5. The method of claim 3, wherein one or more brake system components include an electrically-actuated hydraulic brake booster pump, and a vacuum-actuated brake booster.

6. The method of claim 5, wherein the adjustments include operating the electrically-actuated pump to increase a hydraulic brake boost pressure.

7. The method of claim 5, wherein the adjustments include operating an engine for a duration to increase the brake booster vacuum.

8. The method of claim 3, wherein the hard pedal condition includes requiring a larger pedal force for a given brake pedal displacement.

9. The method of claim 3, wherein the hard pedal condition is not inferred based on an estimated change in brake pedal position.

10. A method for improving brake pedal feel in a vehicle with an engine, comprising:
    boosting engine intake air via a compressor; and
    upon brake pedal application, adjusting a brake control variable in response to an impending change in a pedal feel towards a harder pedal feel, the impending change inferred based on a hydraulic brake line pressure relative to a brake booster pressure before the harder pedal feel occurs.

11. The method of claim 10, wherein the compressor is coupled through a shaft to a turbine, the turbine having a wastegate.

12. The method of claim 11, wherein the adjustment is performed before the harder pedal feel changes, the adjustment maintaining the pedal feel by maintaining a ratio of pedal force to brake pedal displacement at less than a threshold.

13. The method of claim 12, wherein the impending change in pedal feel is inferred without estimating a brake pedal position.

14. The method of claim 12, wherein the impending change in pedal feel includes, when a change in hydraulic brake line pressure relative to a change in brake booster pressure is higher than a threshold amount, inferring an impending hard pedal feel.

15. The method of claim 12, wherein the brake control variable includes a hydraulic brake boost pressure, and wherein the adjustment includes, as the impending change in pedal feel moves towards the harder pedal feel, increasing the hydraulic brake boost pressure to increase the hydraulic brake line pressure by increasing output of an electrically-actuated hydraulic brake booster pump.

16. The method of claim 15, wherein the pedal feel includes a pedal force required to displace a brake pedal to a given pedal position, and wherein the harder pedal feel includes a pedal force greater than a threshold amount to move the brake pedal to the given pedal position.

17. The method of claim 15, wherein increasing the hydraulic brake boost pressure includes operating the electrically-actuated hydraulic brake booster pump to increase a pump output, the pump coupled to a brake system of the vehicle.

18. The method of claim 12, wherein the brake control variable is a brake booster vacuum.

19. The method of claim 18, wherein the adjustment includes, as the impending change in pedal feel moves towards the harder pedal feel, increasing the brake booster vacuum by operating the engine for a duration.

20. The method of claim 10 wherein the engine includes direct fuel injection.

* * * * *